United States Patent [19]

Myers et al.

[11] Patent Number: 5,684,477

[45] Date of Patent: Nov. 4, 1997

[54] ELECTRONIC SYSTEMS INTERFACING

[75] Inventors: Peter James Myers, Letchworth Garden City; Anthony John Smith, Langford, both of Great Britain

[73] Assignee: Smith Myers Communications Limited, England

[21] Appl. No.: 503,334

[22] Filed: Jul. 17, 1995

[51] Int. Cl.⁶ .................................................. H03K 17/94
[52] U.S. Cl. ...................... 341/22; 341/176; 340/825.24; 369/30; 369/70
[58] Field of Search .............................. 341/20, 21, 22, 341/23, 27, 34, 175, 176; 348/734; 379/88; 340/825.19, 825.24, 825.25, 825.37; 369/24, 30, 32, 33, 69, 70

[56] References Cited

U.S. PATENT DOCUMENTS

| | | | |
|---|---|---|---|
| 4,521,870 | 6/1985 | Babbel et al. | 341/20 |
| 4,700,377 | 10/1987 | Yasuda et al. | 341/23 |
| 4,746,919 | 5/1988 | Reitmeier | 341/23 |
| 4,825,209 | 4/1989 | Sasaki et al. | 341/23 |
| 5,212,473 | 5/1993 | Louis | 341/22 |
| 5,374,924 | 12/1994 | McKiel, Jr. | 341/21 |
| 5,412,189 | 5/1995 | Cragun | 341/21 |

*Primary Examiner*—Jeffery Hofsass
*Assistant Examiner*—Andrew Hill
*Attorney, Agent, or Firm*—Barnes & Thornburg

[57] ABSTRACT

An arrangement for use in the control of electronic systems and/or equipment by an operator which enables the operator to use tactile touch and audio information to control or select facilities of the electronic systems and/or equipment under the control of the operator.

12 Claims, 1 Drawing Sheet

ELECTRONIC SYSTEMS INTERFACING

This invention is concerned with electronic systems and equipment in general and more particularly, but not exclusively, to arrangements for facilitating the interfacing of an operator with an electronic system with which the operator is concerned.

It is a particular object of the invention to provide arrangements for facilitating the use of electronic equipment and/or systems in situations where it is not possible for the operator conveniently to look at a keyboard or input device and/or a screen or visual display unit.

It is well known that many operators of electronic equipment at times need to look at a keyboard in order to be sure that the correct key or keys is/are being selected whilst at the same time, in practice, having to look at the screen to make sure that the information appearing upon the screen is that required, or if it is necessary to make adjustments to what is being shown on the screen without losing visual contact with the screen.

This type of problem has been found to be of great practical inconvenience leading to error in the operation of the equipment/systems.

It is an object of the present invention to provide an arrangement which at least reduces problems such as above mentioned.

Broadly, according a first aspect of the present invention there is provided an arrangement for use in the control of electronic systems and/or equipment whereby an operator is able to use tactile touch and audio information to control or select facilities of the electronic systems and/or equipment under the control of the operator.

For a better understanding of the invention and to show how to carry the same into effect reference will now be made no the accompanying drawing in which.

Figure 1:
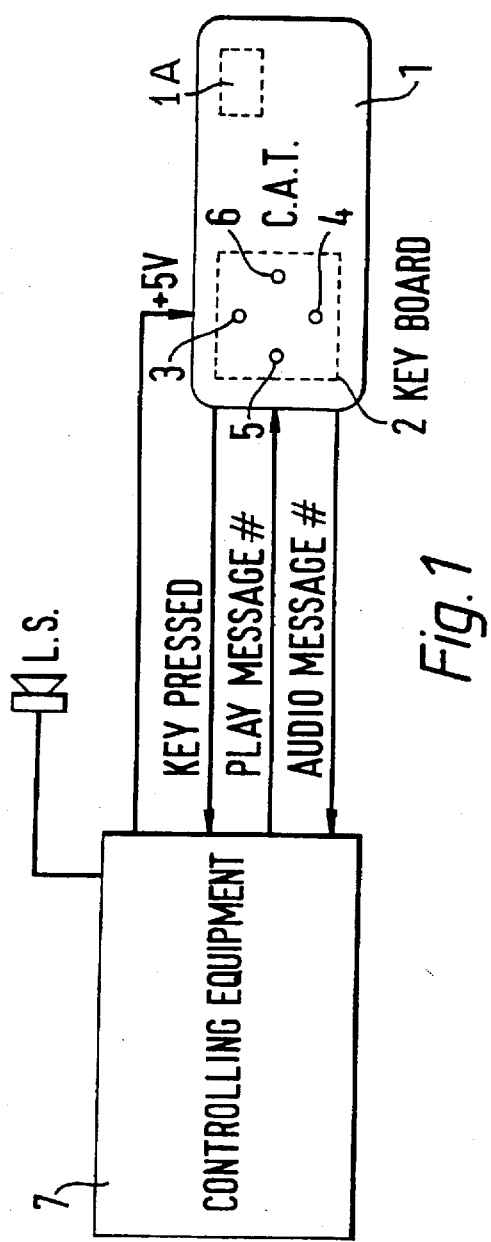
FIG. 1 is a block diagram illustrating the basic concepts of the invention.

Referring now to FIG. 1, the arrangement shown therein includes a compact audio terminal 1 in accordance with the invention having a keyboard/pad 2 and storage facilities 1A for storing/containing/and replaying recorded audio messages in a form which facilitates the requesting of such audio messages by means of an essentially simple serial protocol.

In this specification the term compact audio terminal is considered to embrace a unit which incorporates an audio message storage capacity together with a keyboard/pad facility which enables interrogation of the content of the store.

The compact audio terminal 1 for the embodiment shown in the FIG. 1 thus incorporates a key pad 2 which includes four operator keys 3, 4, 5 and 6 by means of which an operator can select or indicate/initiate/transfer a recorded message selection to the electronic system and/or equipment.

The operator keys are arranged to serve as upper and lower keys 3 and 4 and left hand and right hand keys 5 and 6.

To understand the function of the keys 3 to 6 it is convenient to presume that the stored recorded audio messages stored in the compact audio terminal 1 are known to the electronic system/equipment. The commands to the electronic system/equipment are arranged to be hierarchial and in such manner as to be addressable by a menu facility whose relationship to the keyboard/pad 2 is such that the method of selection within the menu system is such that on depressing the lower key 4 the operator goes deeper (lower) into the menu and by depressing the upper key 3 the operator goes higher up in the menu. Depression of the left hand and right hand keys 5 and 6 enables selection within a number of stored further message options at the menu level selected by operation of the keys 3 and 4.

Simultaneous depression of two keys is arranged to enable message and functional possibilities from the menu such as for example, reset, volume control etc.

The compact audio terminal 1 is operationally connected with equipment 7 for controlling the operation of the terminal 1.

The inter-relationships between the controlling equipment 7 and the compact audio terminal 1 are such that depression of a selected key 3,4,5 or 6 or combinations thereof causes an appropriate message associated with the key or keys depressed to be passed to the controlling equipment 7 which latter so responds to the signal(s) associated with the key depression(s) as to transmit to the keyboard/pad a request for a particular stored message or message sequence to be transferred from the compact audio terminal 1 to the equipment 7. Such particular message is transferred from the keyboard/pad arrangement in the form of an audio message to be mixed and/or amplified and broadcast, by way of the controlling equipment 7 and a loudspeaker LS or other audio device.

The four keys 3,4,5 and 6 of the compact audio terminal 1 are so arranged that they can be easily located by feel so that an operator does not need to look at the keyboard/pad 2 when scanning/working through menu items.

With the system of the invention any request for individual messages is effected by use of a message number rather than by the conventionally used arrangements for defining start and stop memory locations for a particular message. In practice, this provides a significant advantage when altering or converting the stored messages involved in the menu to a different language, or other form when executing any other mode of variation of a message content.

In addition, it will be noted that the system is essentially independent of message length, the latter invariably being a problem with arrangements involving message length stop and start locations, since the underlying requirements of the proposals of the invention are that the messages whatever their individual lengths have to be stored in in the correct menu order and that the total message run time is not greater that the capacity of the compact audio terminal 1.

The FIG. 1 illustrates by the arrow headed lines the message/control information links between the controlling equipment 7 and the compact audio terminal 1. The links shown include key pressed; play message, and audio message.

Figure 2:
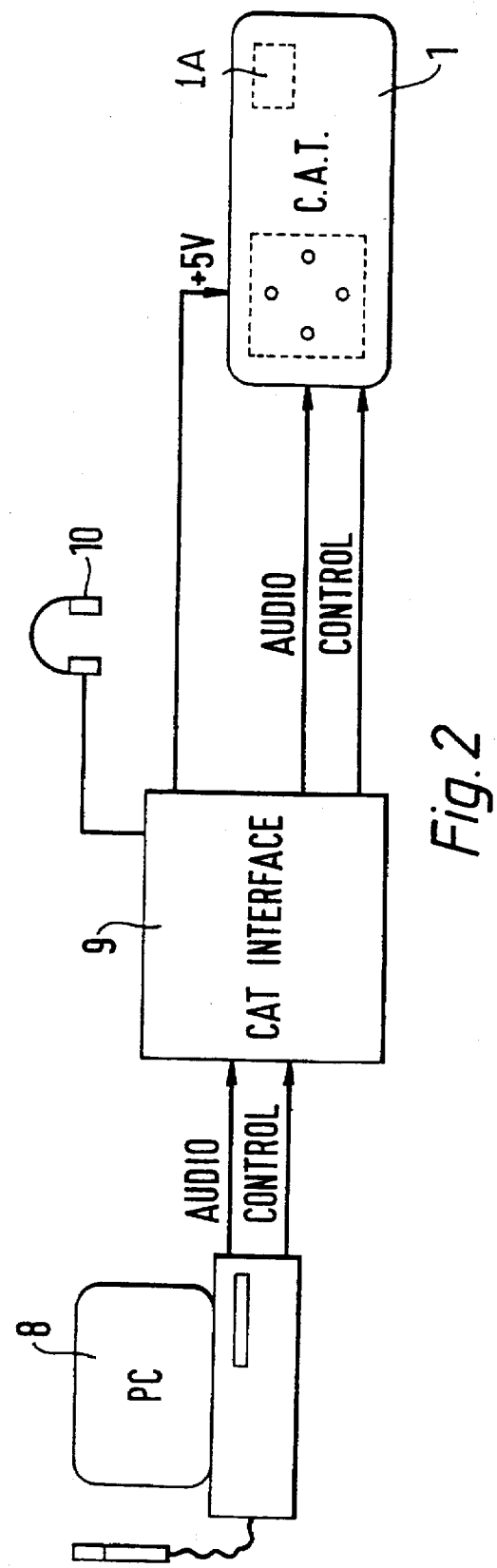
FIG. 2 is a schematic block diagram illustrating an application of the concepts of the invention and in particular how required audio messages are recorded and how the desired audio waveforms are programmed into the arrangement.

Referring now to FIG. 2, the apparatus shown therein involves a personal computer 8 equipped with a so called sound blaster pro sound card. A compact audio terminal interface 9 is provided between the personal computer 8 and the compact audio terminal 1 to enable audio messages to be recorded reviewed and/or edited. By using the software associated with the interface 9 individual messages can be recorded and their order selectively arranged before the compact audio terminal 1 is itself programmed to provide the store of recorded messages.

The stored messages can be reviewed by playing them from the interface. Headphones 10 enable the messages to be heard during the programming.

The programming arrangement is shown in FIG. 2 by the arrow headed lines indicating the message/control information links between the personal computer 8, the compact audio interface 9 and the compact audio terminal 1. The links shown indicate the audio and control links.

We claim:

1. An audio terminal apparatus for use in controlling electronic systems and equipment, the apparatus comprising an input device having a plurality of tactile keys, an audio memory for storing variable length audio messages, and an interface for coupling the input device and the audio memory to the equipment, the interface transmitting a tactile key data signal from the input device to control the equipment, receiving an audio message play request signal from the equipment, and transmitting an audio message data signal from the audio memory to the equipment corresponding to said audio message play request signal.

2. The apparatus of claim 1, wherein the input device includes a keyboard having first, second, third, and fourth tactile keys.

3. The apparatus of claim 2, wherein the first, second, third, and fourth keys are spaced apart in a diamond pattern.

4. The apparatus of claim 1, wherein the audio message play request signal comprises an audio message number corresponding to a desired stored message, without using a specific set of start and stop memory locations in the audio memory.

5. The apparatus of claim 1, wherein the interface is a serial digital interface.

6. The apparatus of claim 1, wherein the equipment includes a predefined set of menu commands arranged in a hierarchical command structure and a currently selected location in the hierarchical command structure, and the currently selected location in the hierarchical command structure varies based on the tactile key data signal.

7. The apparatus of claim 6, wherein input device includes a keyboard having at least first, second, and third tactile keys, a tactile key data signal from the first key causing the controlling system to select a location in the hierarchical command structure at a lower level than the currently selected location, a tactile key data signal from the second key causing the controlling system to select a location in the hierarchical command structure at a higher level than the currently selected location, and a tactile key data signal from the third key causing the controlling system to select a location in the hierarchical command structure at the same level as the currently selected location.

8. The apparatus of claim 7, wherein the input device generates a different tactile key data signal upon simultaneous depression of any two keys.

9. The apparatus of claim 8, wherein the different tactile key data signal is a reset command.

10. The apparatus of claim 8, wherein the different tactile key data signal is a volume control command.

11. The apparatus of claim 1, further comprising means coupled to the input device for changing the audio messages stored in the audio memory.

12. The apparatus of claim 11, wherein the message changing means includes a personal computer, and the interface is coupled to the personal computer to enable the audio messages stored in the audio memory to be recorded, reviewed and edited.

* * * * *